United States Patent [19]

Blaimschein

[11] Patent Number: 5,137,399
[45] Date of Patent: Aug. 11, 1992

[54] APPARATUS FOR PROCESSING WORKPIECES

[75] Inventor: Gottfried Blaimschein, Steyr, Austria

[73] Assignee: GFM Gesellschaft fur Fertigungstechnik und Maschinenbau Aktiengesellschaft, Steyr, Austria

[21] Appl. No.: 657,328

[22] Filed: Feb. 19, 1991

[30] Foreign Application Priority Data

Feb. 21, 1990 [EP] European Pat. Off. ......... 90890044.2

[51] Int. Cl.$^5$ .............................................. B23Q 3/06
[52] U.S. Cl. ...................................... 409/80; 269/55;
83/76.1; 83/76.6; 83/76.9; 83/452; 83/466; 144/356
[58] Field of Search ........................ 83/76.1, 76.6, 76.9, 83/375, 452, 451, 457, 466, 29; 269/55, 56; 408/3, 103, 108; 409/197, 225, 226, 80; 144/356

[56] References Cited

U.S. PATENT DOCUMENTS

| 3,805,650 | 4/1974 | Pearl | 83/76.9 |
| 3,834,258 | 9/1974 | Zumstein | 83/76.9 |
| 4,348,924 | 9/1982 | Jenker | 83/76.1 |

*Primary Examiner*—Hien H. Phan
*Assistant Examiner*—Allan M. Schrock
*Attorney, Agent, or Firm*—Kurt Kelman

[57] ABSTRACT

An apparatus for processing workpieces, comprises a fixing deck, which has a supporting surface and is provided with fixing device, and a numerically controlled tool unit, which is movable over the supporting surface. In order to effect a reliable fixing of the workpieces by a simple and effective method, the fixing device comprises at least one holding-down unit, which includes a holding-down carriage, which is movable over the supporting surface, and a power-operable holding-down finger, which is operable at selectable locations, and that the carriage moving device and finger actuating device are adapted to be controlled in dependence on the control of the tool unit.

2 Claims, 2 Drawing Sheets

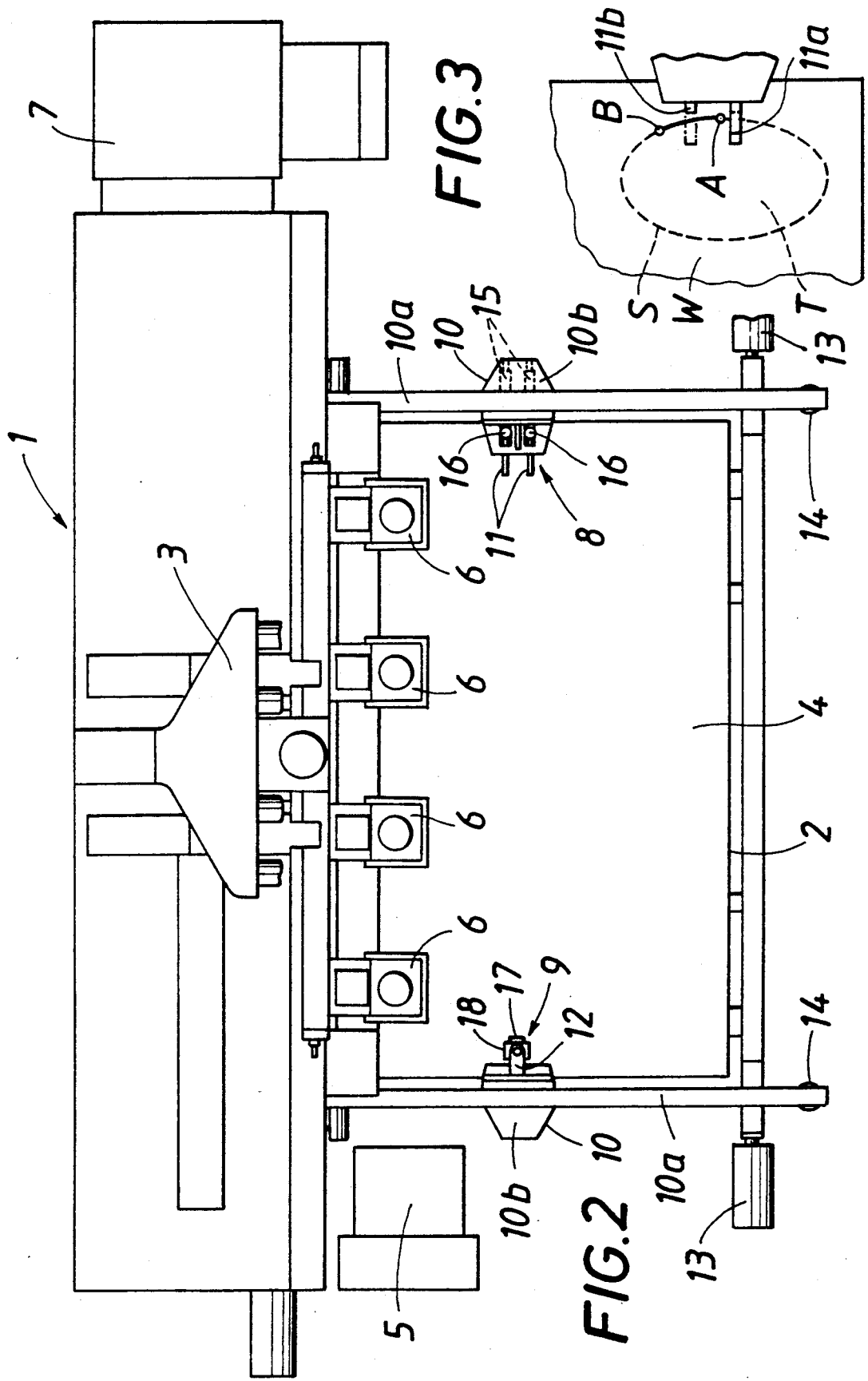

[5,137,399]

APPARATUS FOR PROCESSING WORKPIECES

BACKGROUND OF THE INVENTION

1. Field of the Invention

This invention relates to an apparatus for processing workpieces, particularly superimposed workpieces, comprising a table having a supporting surface, means for fixing the workpieces to the supporting surface, and a numerically controlled tool unit, which is movable over the supporting surface.

2. Description of the Prior Art

For a joint processing of workpieces which are superimposed in a plurality of layers, for instance, for cutting blanks out of metal plates and for drilling such blanks, or for a cutting of non-adherent materials, such as prepreg materials covered with films on both sides, it is necessary to hold the stacks of workpieces properly relative to the supporting surface and relative to each other. This has been done by screwing or riveting the stacks of workpieces to a fixing pallet, and the fixing pallet is then fixed to the table by the fixing means, which may comprise holding-down claws, suction boxes cooperating with the supporting surface, or other suitable means. For a processing of layers of strip material the layers of each stack are held together by adhesive films and are fixed to a vacuum deck. For a processing of aluminum plates it has been proposed to hold the plates of the stack together by deep-freezing. All these known measures are rather expensive and time-consuming and require the use of auxiliary materials and in some cases require the workpieces to be altered, e.g., perforated. Besides, said known methods must specifically be adapted to the nature of the workpieces and to the methods for processing them.

SUMMARY OF THE INVENTION

It is an object of the invention to avoid the disadvantages mentioned above and to provide an apparatus which permits an efficient and relatively simple fixing of stacks of any desired workpieces, which can be used in wide fields of application for a proper processing in accordance with various methods.

That object is accomplished in accordance with the invention by at least one holding-down unit, which includes a holding-down carriage, movable over the supporting surface independently of the tool unit, and a power-operable holding-down finger, which is operable at selectable locations to retain the workpieces on the supporting surface. The means for moving the carriage and for actuating the finger are controlled in dependence on the control of the tool unit. In such a holding-down unit the holding-down finger can freely be moved to any desired location and said holding-down unit can cooperate with the means for controlling the tool unit in such a manner that the operation of said holding-down unit and particularly of the holding-down finger can be coordinated with processing operation to be performed by the tool unit. As a result, the region in which the workpiece layers are compressed can be selected in coordination with the desired processing operation in such a manner that the processing forces which are exerted will not shift the workpiece layers relative to each other and to the supporting surface so that it is no longer necessary to interconnect the layers but the layers can be held in position by the holding-down unit, which can be used with various workpieces and for different processing operations. When it is desired to cut a plurality of workpieces from a stack or to cut the workpieces into sections, it will be desirable to fix the entire stack to the supporting surface by conventional clamping claws or, where a vacuum deck is employed, by a suction action. In that case the stack is desirably placed on a fixing pallet but that pallet serves only as a support so that it can be re-used as often as is desired. That fixing pallet ensures that the stack will be held in position relative to the supporting surface and in that case the holding-down unit will ensure that the layers of material and the workpiece sections formed from the layers will be held in position relative to the pallet.

If the holding-down finger carries a brakable holding-down roller, it will be possible to move the holding-down unit relative to the stack of workpieces without reducing the holding-down force. Such a movement of the holding-down unit relative to the workpiece stack may be desirable to move the holding-down finger from one holding-down position to another in a certain processing sequence. During such a displacement the holding-down roller will roll on the uppermost workpiece under a constant holding-down pressure but will be braked to stop in a desired holding-down position in which the roller will prevent a movement of the holding-down finger and the stack of workpieces relative to each other.

In a particularly desirable arrangement the holding-down carriage is provided with two mutually independently operable holding-down fingers, which can be operated simultaneously or in alternation. For instance, when workpieces, such as diamond-shaped workpieces, are to be formed by cutting the stack along a closed line of cut throughout the height of the stack, it will be possible to actuate one holding-down finger when the cutting tod is at the starting point of the line of cut and the second holding-down finger may be actuated as soon as the tool has left the region of the second holding-down finger and the first holding-down finger may be lifted from the stack before the tool returns to the starting point so that the cutting along the closed line of cut can be completed without an interruption of the action of the tool and without an interruption of the holding-down action. Besides, the two holding-down fingers may be used also to fix workpieces when they have been bisected by the processing or the workpieces may be held down by forces which are twice the holding-down force which can be exerted by only one holding-down finger.

BRIEF DESCRIPTION OF THE DRAWING

FIGS. 1 and 2 are a front elevation and a top plan view, respectively, showing an apparatus in accordance with the invention.

FIG. 3 is a diagram illustrating the use of the holding-down unit of that apparatus.

BRIEF DESCRIPTION OF THE PREFERRED EMBODIMENT

Figure 1:
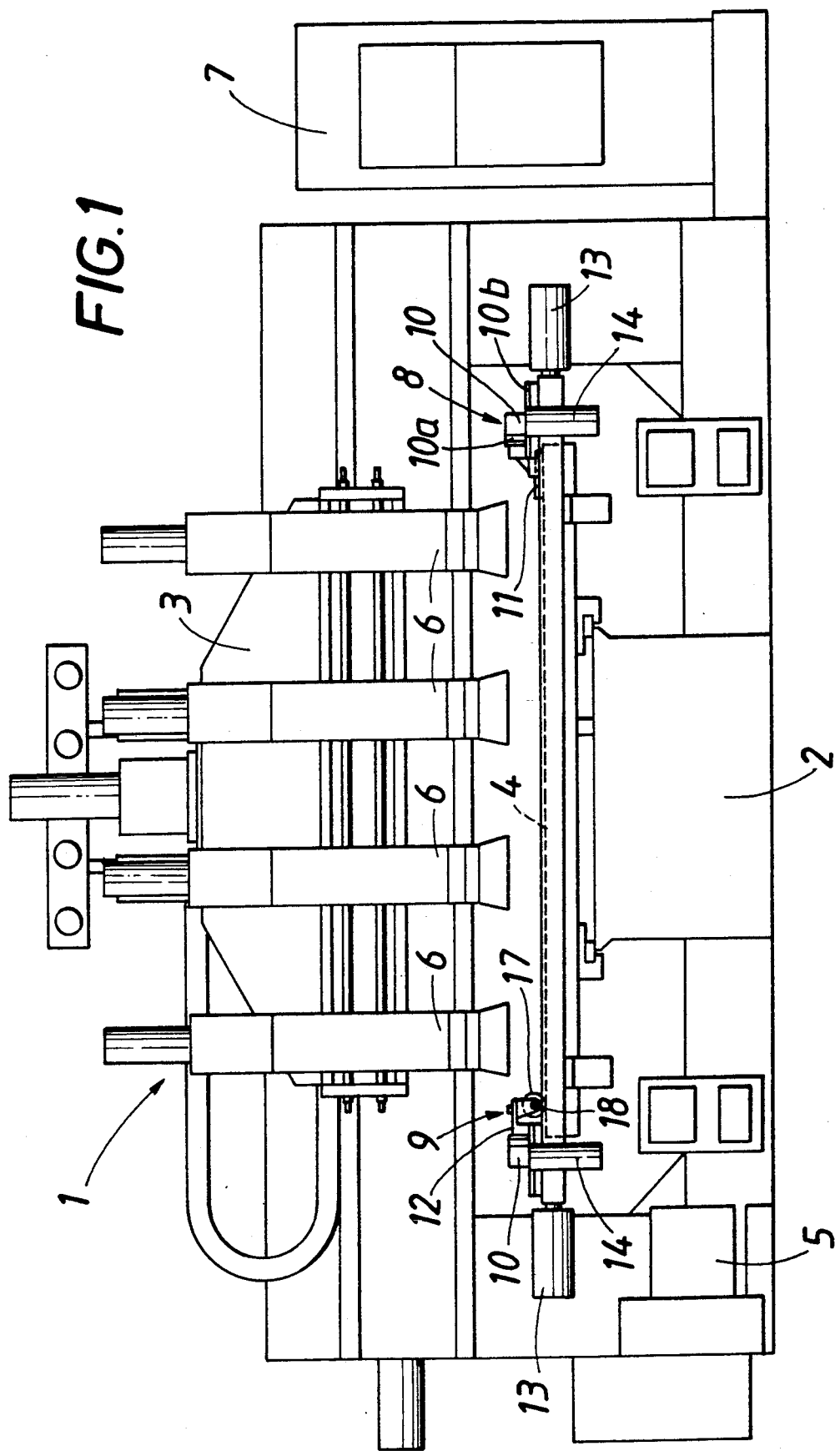

An illustrative embodiment of the invention will now be described more in detail with reference to the diagrammatic drawing.

An apparatus 1 for a joint processing of a plurality of workpieces W which constitute superimposed layers of a stack comprises a table 2 and a tool unit 3. The table 2 has a supporting surface 4 for supporting the workpieces to be processed and fixing means, such as a vacuum pump 5 for applying a vacuum to the supporting surface 4 so that the workpieces will be held in position on the supporting surface. The tool unit 3 is provided with a plurality of tools 6, such as drilling tools or milling cutters, and can be operated to move said tools over the supporting surface 4. The tools may be positioned by a movement of the supporting surface and/or of the tool unit relative to each other. The movement of the tools 6 to the desired positions and the operation of the tools 6 to perform the desired processing are controlled by a numerical control 7.

Because it is desired to effectively and reliably fix the workpieces to the supporting surface 4, the fixing means comprise, in addition to the means for applying a vacuum to the supporting surface 4, one or more holding-down units 8, 9, in dependence on the requirements to be met in a given case. Each holding-down unit consists of a holding-down carriage 10, which is movable over the supporting surface 4 to any desired position, and at least one power-operable holding-down finger 11, 12. The holding-down carriage 10 comprises a longitudinal slide 10a and a cross-slide 10b so that the holding-down fingers 11, 12 can be moved over the supporting surface 4 to any desired location. By means of the numerical controller 7 the drive means 13, 14 for moving the slides 10a and 10b and the means 15, 16 for actuating the holding-down fingers can be controlled in dependence on the program for the operation of the tool unit 3. That control permits the holding-down fingers to act on the workpieces at the optimum locations and permits an optimum coordination of the holding-down action with the processing operation.

In dependence on the desired processing, two individually operable holding-down fingers 11 may be provided, as is indicated for the holding-down unit 8, or only one holding-down finger 12 may be provided on a holding-down unit, as is indicated for the holding-down unit 9. Holding-down finger 12 carries a holding-down roller 17 provided with a brake 18. Holding-down fingers 11 can be actuated in alternation and the holding-down action by means of the holding-down roller 17 may be effected during a positioning operation, in which case the holding-down roller can be braked so that the holding-down finger 12 will be held in a desired holding-down position.

When it is desired to cut a blank T out of workpiece w of a stack, the holding-down unit 9 can be moved so that its holding-down roller 17, follows along a closed line of cut in at least intermittent movement without reducing the holding-down force. In this way a cut along a closed line of cut can be performed without an obstruction by the holding-down finger. As is indicated in FIG. 3 the holding-down fingers 11 of the holding-down unit 8 are actuated in alternation in such a manner that the first finger 11a is initially advanced and forced against the workpieces W, the tool then begins to cut from the starting point A and proceeds to cut along the line of cut S until the tool has moved past the region in which the second holding-down finger 11b is intended to engage the workpiece W, e.g., at B. The second holding-down finger 11b is then extended to engage the blank T and the first holding-down finger 11a can then be released and retracted and the workpiece is now free to be cut along the entire line of cut S. When the first holding-down finger 11a has been retracted, it may be used to hold down the workpiece outside the blank T so that the stack is reliably held in position.

I claim:

1. In an apparatus for processing workpieces, comprising
    a table having a supporting surface,
    a power-operable tool unit associated with said table and movable over said supporting surface to process a workpiece on said supporting surface, and
    control means for numerically controlling the operation of said tool unit,
    the improvement comprising
    at least one holding-down unit that includes a holding-down carriage wherein two holding-down fingers are mounted for retaining the workpieces in position on said supporting surface, the holding-down unit being movable over said supporting surface independently of the tool unit and said fingers being extendable and retractable,
    drive means operable to move said carriage over said supporting surface, and
    power-operable actuating means for extending and retracting said fingers to force the fingers against a workpiece on said supporting surface and to retract it from said workpiece, the actuating means being operable to actuate said holding-down fingers independently of each other,
    said control means being adapted to control said drive means and said power-operable actuating means.

2. The improvement set forth in claim 1, further comprising
    a holding-down roller rotatably mounted in said holding-down finger,
    each holding-down finger being reciprocable to move each holding-down roller into and out of engagement with said workpiece, and
    means for braking said holding-down roller.

* * * * *